United States Patent [19]

Ando

[11] Patent Number: 5,397,273

[45] Date of Patent: Mar. 14, 1995

[54] REAR DERAILLEUR FOR A BICYCLE

[75] Inventor: Yoshiaki Ando, Sakai, Japan

[73] Assignee: Shimano Inc., Osaka, Japan

[21] Appl. No.: 188,768

[22] Filed: Jan. 31, 1994

[30] Foreign Application Priority Data

Feb. 3, 1993 [JP] Japan .................. 5-015817

[51] Int. Cl.[6] .............................................. F16H 61/00
[52] U.S. Cl. ..................................................... 474/82
[58] Field of Search ..................................... 474/78-82

[56] References Cited

U.S. PATENT DOCUMENTS

| 4,599,079 | 7/1986 | Chappell | 474/82 X |
|---|---|---|---|
| 4,637,808 | 1/1987 | Nakamura | 474/80 |

FOREIGN PATENT DOCUMENTS

| 75927 | 4/1983 | European Pat. Off. |
| 2551418 | 3/1985 | France . |
| 2574144 | 6/1986 | France . |
| 47-27656 | 7/1972 | Japan . |
| 52-60059 | 5/1977 | Japan . |
| 55-66894 | 5/1980 | Japan . |
| 62-10874 | 3/1987 | Japan . |

OTHER PUBLICATIONS

Patent Abstracts of Japan, vol. 17, No. 580 (M-1500) 21 Oct. 1993 (JP-A-05 170 168).

Primary Examiner—Michael Powell Buiz
Attorney, Agent, or Firm—Dickstein, Shapiro & Morin

[57] ABSTRACT

A rear derailleur for a bicycle comprises a hub axis, a mounting member, a bracket body supported by the mounting member to be pivotal about a first axis extending substantially parallel to the hub axis, and a support member disposed forwardly of the bracket member for supporting a chain guide wheel and a chain tension wheel to be pivotal about a second axis extending substantially parallel to the first axis. The derailleur further comprises a pair of pivot links interconnecting the bracket member and the support member and arranged substantially parallel to a first phantom line extending through the first axis and the second axis as seen in a direction along the hub axis, and first and second tension springs for biasing the bracket member to pivot relative to the bicycle frame and for biasing the chain guide wheel and the chain tension wheel to pivot relative to the support member, respectively, to thereby apply a tension to a chain. The guide wheel is disposed close to a position under the gears such that, with a vertical pivotal movement about the first axis of the support member, the guide wheel is movable toward or away from the gears by a long distance for a pivoting angle of the support member. Further, the guide wheel is pivotal downward about the second axis away from the gears by a long distance for a pivoting angle of the guide wheel.

15 Claims, 6 Drawing Sheets

REAR DERAILLEUR FOR A BICYCLE

BACKGROUND OF THE INVENTION

1. Field of the Invention

The present invention relates to rear derailleurs for bicycles. More particularly, the invention relates to a rear derailleur including a mounting member having a coupling device for connection to a bicycle frame, a bracket member supported by the mounting member to be pivotable about a first axis extending substantially parallel to a hub axis, a support member disposed forwardly of the bracket member for supporting a chain guide wheel and a chain tension wheel to be pivotable about a second axis substantially parallel to the first axis, a pair of pivot links arranged substantially parallel to a first phantom line extending through the first axis and second axis as seen in a direction along the hub shaft for interconnecting the bracket member and support member, a first tension spring for biasing the bracket member to pivot relative to the bicycle frame, thereby to apply a tension to a chain, and a second tension spring for biasing the guide wheel and tension wheel to pivot relative to the support member, thereby to apply a tension to the chain.

2. Description of the Related Art

The bicycle rear derailleur of the type noted above has a relatively simple construction with regard to the mounting member and support member in that the first phantom line and pivot links extend substantially parallel to each other as seen in the direction along the hub shaft. Where the derailleur is the type attached to a bicycle frame having a derailleur mounting extension formed at a rear fork end of the bicycle frame, the position of the derailleur relative to the hub axis is determined by the construction of the derailleur mounting extension. The pivot links are required to have a length for causing the guide wheel to move sideways through a predetermined stroke, thereby changing the chain from one gear to another as desired. Consequently, with a shifting operation, the guide wheel is sideways movable in a region forwardly of and relatively remote from the gears.

Figure 9:
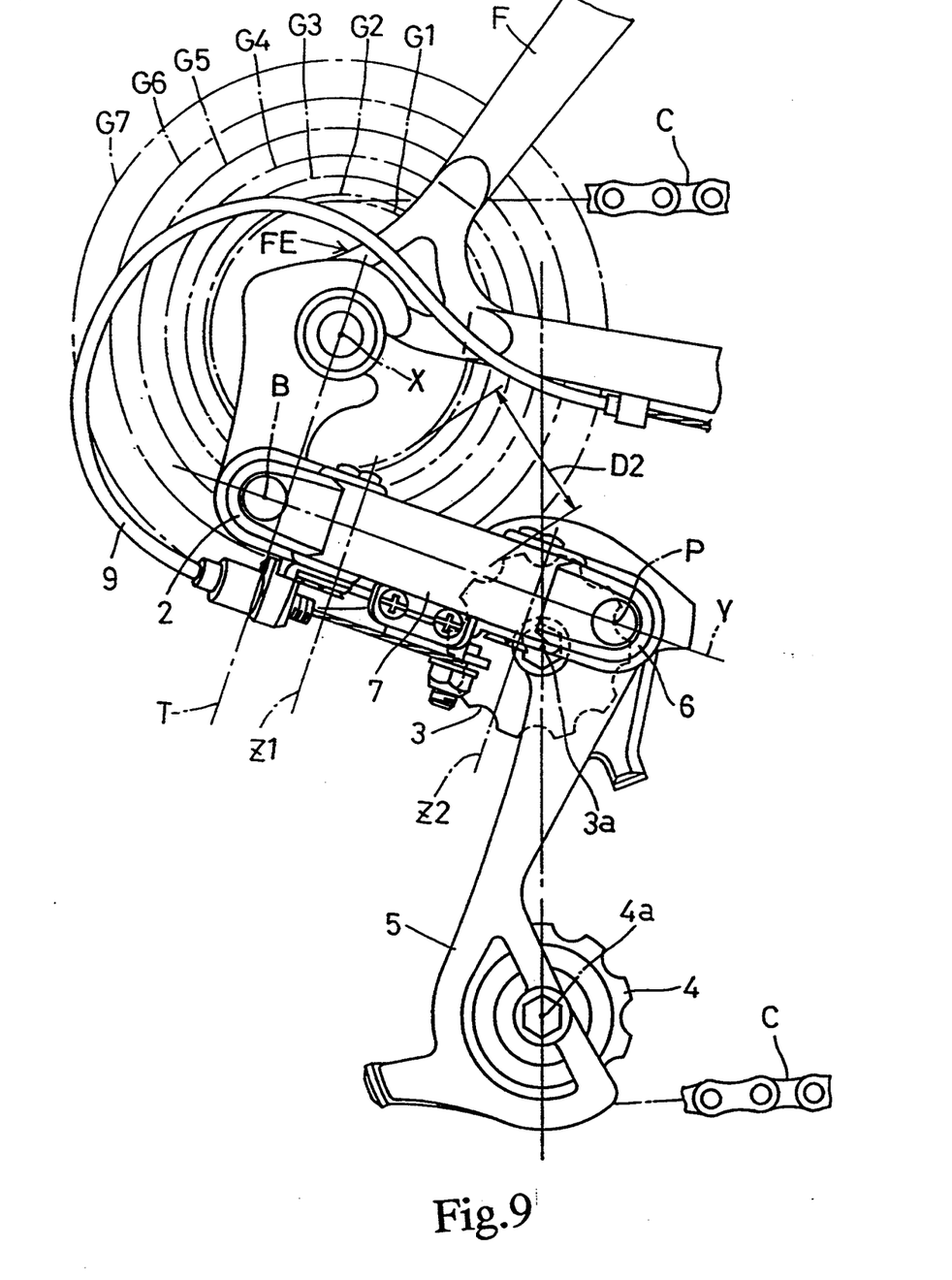
FIG. 9 is a side view of a conventional rear derailleur.

When the rear derailleur is attached to the bicycle frame with the chain engaged with a 13-tooth gear of the rear gear assembly, a phantom line extending through rotational axes of the guide wheel and tension wheel may be adjusted to be vertical. Then the derailleur may be in a desired tension condition having an appropriate chain tension, regardless of a speed to which the derailleur is shifted. In this assembled posture, however, a phantom line extending through the hub axis and parallel to a pivotal axis about which an outer one of the pivot links is pivotable relative to the bracket member, conventionally, coincides with this pivotal axis as seen in the direction along the hub axis, or, as shown in FIG. 9, extends through a position rearwardly of the pivotal axis, with the guide wheel disposed forwardly of and relatively remote from the gears.

A derailleur of the type attached to a bicycle frame with no derailleur mounting extension provided for the rear fork end is connected to the rear fork end through a bracket. In this case, because of the shape and size of a mounting member, the positional relationship between derailleur and hub axis is substantially the same as that between derailleur and hub axis where the derailleur is the type directly attached to the derailleur mounting extension. That is, the mounting member has such a construction that the former derailleur is in substantially the same positional relationship to the bicycle frame to which the derailleur is attached as the derailleur directly attached to the bicycle frame. Thus, as disclosed in Japanese Patent Publication No. 47-27656, for example, in the derailleur of the type connected to the bicycle frame through a bracket has, as in the directly connected type derailleur, the phantom line extending through the hub axis and parallel to the pivotal axis about which the outer pivot link is pivotable relative to the bracket member coincides with this pivotal axis as seen in the direction along the hub axis, or extends through a position rearwardly of the pivotal axis. As a result, the guide wheel is disposed forwardly of and relatively remote from the gears.

Thus, in the above assembled posture, the conventional derailleurs have the guide wheel located relatively far apart in a forward direction of the bicycle from the gears. To change the chain from one gear to another, the guide wheel moves the chain sideways in a lateral region relatively remote from the gears. Consequently, the guide wheel fails to apply chain disengaging and engaging forces efficiently. Such a shifting operation does not achieve high efficiency, with a relatively long time consumed until completion of the operation.

SUMMARY OF THE INVENTION

An object of the present invention is to provide a rear derailleur for a bicycle, which has a relatively simple construction and yet assures high shifting efficiency.

The above object is fulfilled, according to the present invention, by a rear derailleur for a bicycle comprising a hub axis extending transversely of the bicycle, a mounting member including a coupling portion for connection to a bicycle frame, a bracket body supported by the mounting member to be pivotable about a first axis extending substantially parallel to the hub axis, a support member disposed forwardly of the bracket member for supporting a chain guide wheel and a chain tension wheel to be pivotable about a second axis extending substantially parallel to the first axis, a pair of pivot links arranged substantially parallel to a first phantom line extending through the first axis and the second axis as seen in a direction along the hub axis, for interconnecting the bracket member and the support member, a first tension spring for biasing the bracket member to pivot relative to the bicycle frame, thereby to apply a tension to a chain, and a second tension spring for biasing the chain guide wheel and the chain tension wheel to pivot relative to the support member, thereby to apply a tension to the chain, wherein the mounting member has such a construction that, when the rear derailleur is connected to the bicycle frame through the mounting member, with the chain wound around a rear gear mounted on the bicycle frame and having 13 teeth, the guide wheel and the tension wheel, and with a second phantom line extending vertically, as seen in the direction along the hub axis, through a rotational axis of the guide wheel and a rotational axis of the tension wheel, a third phantom line extending parallel to a first pivotal axis about which an outer one of the pivot links is pivotable relative to the bracket member, and to a second pivotal axis about which the outer pivot link is pivotable relative to the support member, and extending through the hub axis, is located between the first pivotal axis and the second pivotal axis as seen in the direction along the hub axis, and the rotational axis of the guide wheel is located level with or below the first phantom line as seen in the direction along the hub axis.

In the rear derailleur having the above construction according to the present invention, the guide wheel is disposed further rearwardly of the gears than in the prior art. That is, the guide wheel is disposed close to a position under the gears. Consequently, with a vertical pivotal movement about the first axis of the support member, the guide wheel is movable toward or away from the gears by a long distance for a pivoting angle of the support member. In other words, the guide wheel is movable toward and away from the gears with a higher efficiency than in the prior art.

Moreover, in selecting a distance between the guide wheel and a small gear with the derailleur placed in the above assembly posture, the rotational axis of the guide wheel may be set higher or lower than or level with the first phantom line. However, the guide wheel is pivotable about the second axis toward and away from the gears with a higher efficiency when its rotational axis is below or level with the first phantom line than when the rotational axis is above the first phantom line. Where the rotational axis of the guide wheel is below or level with the first phantom line, and when the guide wheel lies adjacent a small gear, the rotational axis of the guide wheel lies substantially level with the second axis about which the guide wheel is vertically pivotable even if the first phantom line is inclined forwardly due a shape of the mounting member and a level of the support member. In this condition, the guide wheel is pivotable downward about the second axis away from the gears by a long distance for a pivoting angle of the guide wheel.

Thus, the guide wheel is efficiently movable toward and away from the gears due both to the vertical pivotal movement about the first axis of the support member and to the vertical pivotal movement about the second axis of the guide wheel. As a result, the guide wheel is movable to a close vicinity of the gears for allowing a chain shifting force to act efficiently on the chain whichever speed may be selected from a range between maximum speed and minimum speed.

Further and other objects, features and effects of the invention will become more apparent from the following more detailed description of the embodiments of the invention taken with reference to the accompanying drawings.

DETAILED DESCRIPTION OF THE PREFERRED EMBODIMENTS

A rear derailleur for a bicycle according to the present invention will be described with reference to the drawings.

Figure 1:
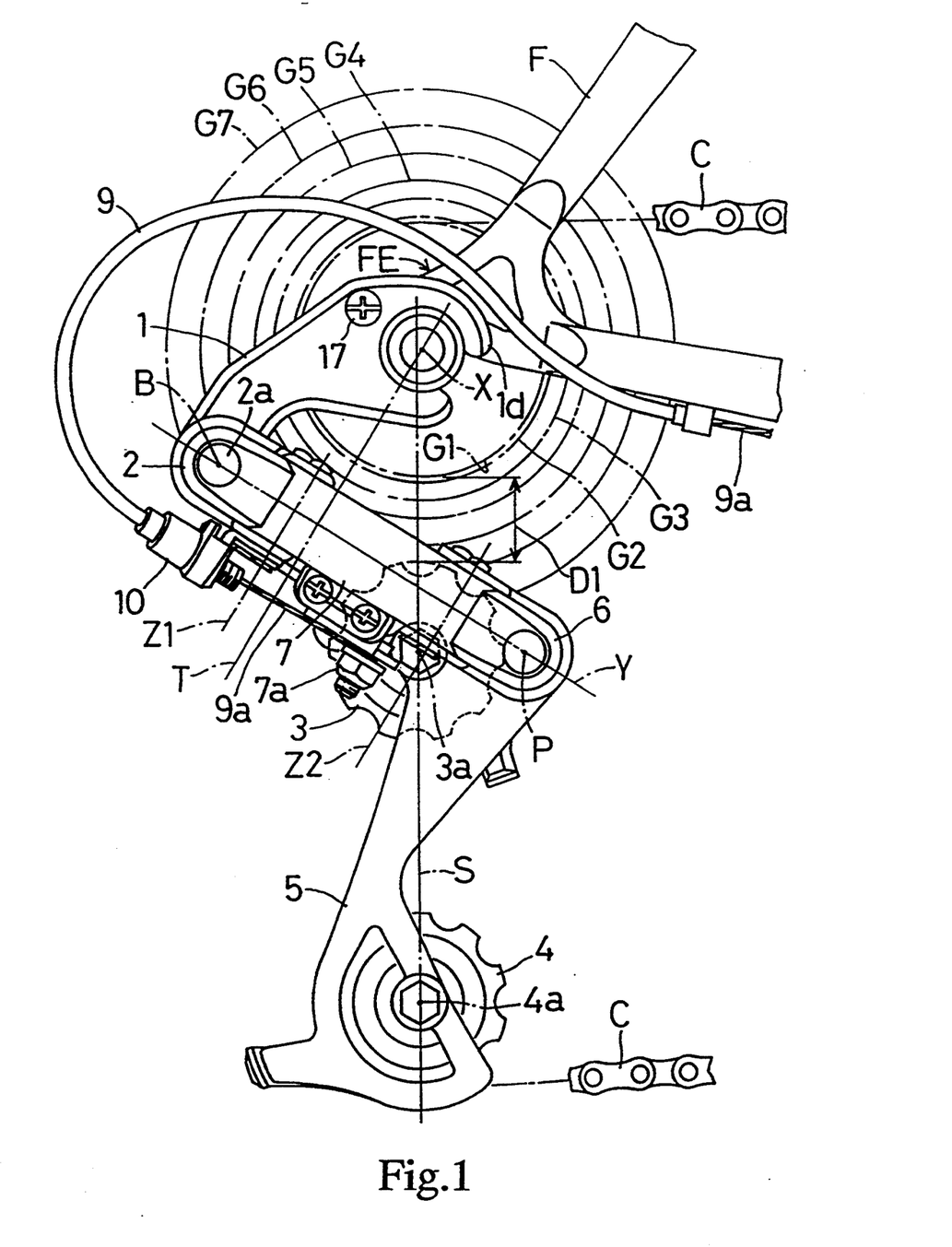
FIG. 1 is a side view of a rear derailleur according to the present invention.
Figure 2:
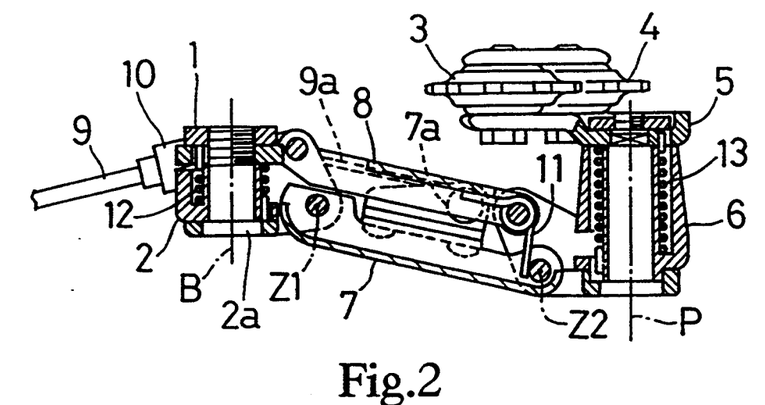
FIG. 2 is a sectional view taken along a phantom line Y of the rear derailleur shown in FIG. 1.

FIGS. 1 and 2 show a bracket member 2 connected to a mounting member 1 to be pivotable about a first axis B, and a chain guide 5 for rotatably supporting a guide wheel 3 and a tension wheel 4.

The chain guide 5 is supported by a support member 6 to be pivotable about a second axis P extending substantially parallel to the first axis B. The support member 6 and bracket member 2 are interconnected through a pair of pivot links 7 and 8 arranged substantially parallel to a first phantom line Y extending through the first axis B and second axis P in side view. The support member 6, bracket member 2 and pivot links 7 and 8 constitute a main rear derailleur body. The main rear derailleur body and mounting member 1 constitute a rear derailleur for a bicycle.

The rear derailleur is attached to the bicycle by connecting the mounting member 1 to a rear fork end FE of a bicycle frame F. In the attached state, the first axis B and second axis P are substantially parallel to a hub axis X.

As seen in FIG. 1, a line extending between the guide wheel 3 and second axis P forms an acute angle with a line extending between the tension wheel 4 and second axis P.

A control cable 9 extending from a shift controller (not shown) has an outer tube connected to an outer tube clamp 10 attached to the bracket member 2. An inner wire 9a of the control cable 9 is connected to an inner wire clamp 7a attached to one of the pivot links 7. When the shift controller pulls the inner wire 9a, the inner wire 9a causes the pivot links 7 and 8 to pivot inwardly of the bicycle frame relative to the bracket member 2. With the bracket member 2, pivot links 7 and 8 and support member 6 forming a four-point link mechanism, the support member 6 moves also inwardly at this time, whereby the guide wheel 3 moves inwardly of the bicycle frame relative to the bracket member 2 to change a chain C from a smaller one to a larger one of gears G1–G7 in a rear gear assembly. When the inner wire 9a is relaxed, the pivot links 7 and 8 pivot outwardly of the bicycle frame relative to the bracket member 2 under the force of a return spring 11 as shown in FIG. 2. As a result, the support member 6 moves also outwardly, whereby the guide wheel 3 changes the chain C from a larger one to a smaller one of the gears G1–G7.

The bracket member 2 is pivotably connected to the mounting member 1. Thus, the support member 6 is vertically pivotable about the first axis B relative to the mounting member 1. A first tension spring 12 mounted in the bracket member 2 as shown in FIG. 2 biases the bracket member 2 to pivot about the first axis 91 relative to the mounting member 1. Thus, the support member 6 is biased to pivot upward about the first axis B relative to the mounting member 1, to apply a tension to the chain C through the guide wheel 3 and tension wheel 4. In other words, the first tension spring 12 biases the bracket member 2 toward the hub axis X. The chain guide 5 is pivotably connected to the support member 6, whereby the guide wheel 3 and tension wheel 4 are vertically pivotable about the second axis P relative to the support member 6. A second tension spring 13 mounted in the support member 6 biases the chain guide 5 to pivot relative to the support member 6. Thus, the guide wheel 3 and tension wheel 4 are biased to pivot about the second axis P relative to the support member 6, to apply a tension to the chain C. In other words, the second tension spring 13 biases the guide wheel 3 toward the hub axis X. With this construction, when the guide wheel 3 moves sideways relative to the bicycle frame to change the chain C from one gear to another, the support member 6 pivots about the first axis B, and the chain guide 3 pivots about the second axis P. As a result, the guide wheel 3 moves sideways as well as vertically to a close vicinity of the gears G1–G7 without contacting the gears G1–G7 to shift the chain C efficiently. The tension springs 12 and 13 maintain the chain C in a predetermined tension whichever of the gears G1–G7 is engaged by the chain C.

Figure 3:
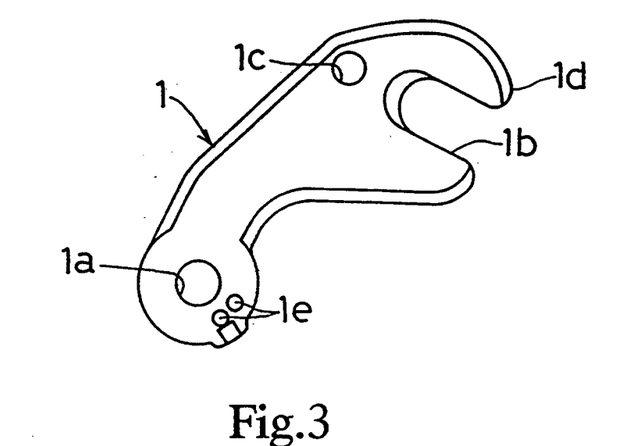
FIG. 3 is a front view of a mounting member according to the present invention.

The mounting member 1 is in the form of a plate shaped in front view as shown in FIG. 3. The mounting member 1 includes a substantially circular bolt bore 1a defined in a rear region thereof to act as a coupling device for connection to the main derailleur body, and a cutout 1b in a forward region to act as a coupling device for connection to the bicycle frame F. The mounting member 1 further includes a substantially circular threaded bore 1c defined adjacent and rearwardly of the cutout 1b for connecting the entire derailleur to the bicycle frame F, with the main derailleur body connected to the mounting member 1.

The bolt bore 1a is used to connect the bracket member 2 of the main derailleur body to the mounting member 1. As shown in FIG. 2, the bolt bore 1a receives a mounting bolt 2a attached to the bracket member 2. The mounting bolt 2a and bracket member 2 are relatively rotatably connected to each other. Thus, the mounting member 1 pivotally supports the bracket member 2 through the mounting belt 2a, whereby the bracket member 2 is connected to the mounting member 1 to be pivotable about the first axis B.

Figure 4:
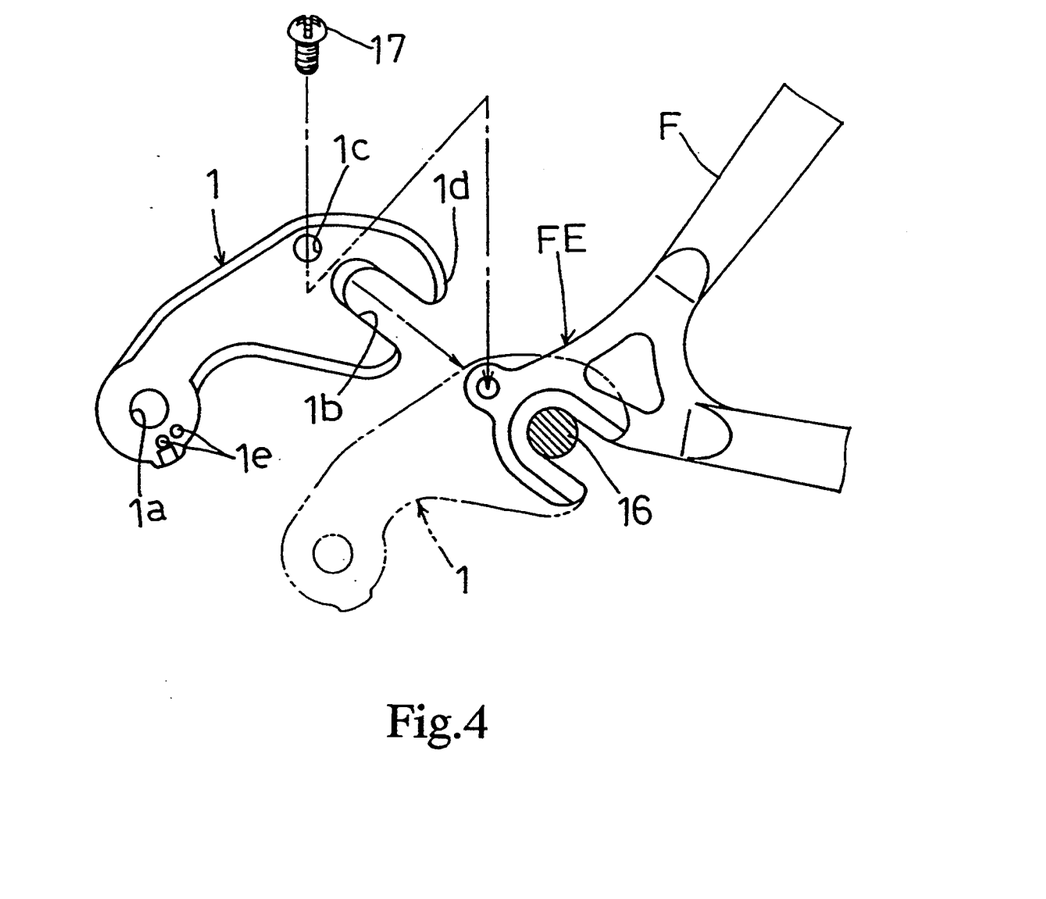
FIG. 4 is a view showing a way in which the mounting member is connected to a bicycle frame.

The cutout 1b and threaded bore 1c are used to connect the mounting member 1 to the rear fork end FE of the bicycle frame F. The cutout 1b and threaded bore 1c also act as a position setting device for setting the mounting member 1 to a predetermined posture relative to the rear fork end FE as shown in FIG. 1. Specifically, as shown in FIG. 4, the mounting member 1 is positioned relative to the rear fork end FE with the cutout 1b receiving a hub shaft 16. Then, a set bolt 17 mounted in the threaded bore 1c is tightened to the rear fork end FE, and the hub shaft 16 is tightened to the rear fork end FE. The mounting member 1 is connected to the rear fork end FE through the tightening forces of the set bolt 17 and hub shaft 16. The cutout 1b enables engagement between the mounting member 1 and fork end FE through the hub shaft 16, and prevents the mounting member 1 from pivoting about the set bolt 17 relative to the rear fork end FE. The threaded bore 1c enables engagement between the mounting member 1 and fork end FE through the set bolt 17, and prevents the mounting member 1 from pivoting about the hub shaft 16 relative to the fork end FE. Thus, the cutout 1b and threaded bore 1c cooperate to set the mounting member 1 to the predetermined posture relative to the rear fork end FE.

The mounting member 1 is attached in the predetermined posture to the rear fork end FE as noted above. The cutout 1b and bolt bore 1a have a mutual positional relationship and shapes as shown in FIG. 3. Consequently, the entire rear derailleur is assembled to the bicycle frame F in a suitable assembled posture as shown in FIG. 1, to perform a smooth shifting operation with excellent responsivity.

The suitable assembled posture will be defined next. The mounting member 1 is attached in the predetermined posture to the rear fork end FE, and the chain C is wound around the guide wheel 3 and tension wheel 4, and engaged with a rear gear G1 having 13 teeth among the rear gears G1–G7. Where the rear gear assembly does not include a gear having 13 teeth, a supplemental rear gear having 13 teeth is temporarily added for assembled position setting purposes to place the chain C in engagement with the gear having 13 teeth. Where the bicycle frame has a plurality of front gears, the chain C is engaged with the largest front gear. Front and rear wheels of the bicycle frame are placed on a level ground, and a second phantom line S extending through a rotational axis 3a of the guide wheel 3 and a rotational axis 4a of the tension wheel 4 is placed perpendicular to the level ground, i.e. placed vertical.

In this position, as shown in FIG. 1, a third phantom line T extending parallel to a first pivotal axis Z1 about which the outer pivot link 7 is pivotable relative to the bracket member 2, and to a second pivotal axis Z2 about which the outer pivot link 7 is pivotable relative to the support member 6, and extending through the hub axis X, is located between the first pivotal axis Z1 and second pivotal axis Z2 as seen in a direction along the hub axis. Further, as seen in the direction along the hub axis, the third phantom line T extends through a position rearwardly of a forward end 1d of the mounting member 1. The rotational axis 3a of the guide wheel 3 is located below the first phantom line Y as seen in the direction along the hub axis. This position corresponds to the suitable posture noted above. In this embodiment, the first and second pivotal axes Z1 and Z2 extend perpendicular to the hub axis X.

In the suitable posture, as seen in FIG. 1, the mounting member 1 as a whole extends rearwardly of the bicycle, with a length of the mounting member 1 longitudinally of the bicycle is greater than a vertical length thereof. It will be understood, therefore, that the position of the main rear derailleur body relative to the hub axis X is generally displaced rearwardly of the bicycle.

Further, in the suitable posture, a shifting operation results in a vertical pivotal movement about the first axis B of the support member 6, and a pivotal movement of the chain guide 5 causes a vertical pivotal movement about the second axis P of the guide wheel 1. Consequently, the guide wheel 3 moves vertically relative to the gears G1–G7 and axially of the hub without contacting the gears G1–G7. At this time, the guide wheel 1 moves vertically relative to the gears G1–G7 in an efficient way to a close vicinity of the gears G1–G7. With the movement axially of the hub of the guide wheel 3, a shifting force is efficiently applied to the chain C.

If the guide wheel 3 moves to an extent below the gears G1–G7 to bring the third phantom line T to the second pivotal axis P or to a position forwardly thereof, the chain C will engage the gears G1–G7 by a significantly reduced amount. This will impair wheel drive, or require a greatly increased force for a shifting operation. However, with the above positional relationship having the third phantom line T located between the first pivotal axis Z1 and second pivotal axis Z2, the guide wheel 3 moves to an extent below the gears G1–G7 not to impair wheel drive or require a greatly increased force for a shifting operation. With the above positional relationship, before the third phantom line T moves to the first pivotal axis Z1 or to a position rearwardly of the first pivotal axis Z1 as shown in FIG. 9, the vertical pivotal movement about the first axis B of the support member 6 causes the guide wheel 3 to move toward or away from the gear G1 by a long distance for a pivoting angle of the support member 6, compared with a state in which the guide wheel 3 lies forwardly of the gears G1–G7.

Further, with the rotational axis 3a of the guide wheel 3 lying below the first phantom line Y, a downward pivotal movement about the second axis P of the guide wheel 3 relative to the support member 6 causes the guide wheel 3 to move away from the gear G1 by a long distance for a pivoting angle of the guide wheel 3, compared with a state in which the rotational axis 3a lies above the first phantom line Y.

In short, the guide wheel 3 is vertically movable relative to the gears G1–G7 in an efficient way based on both the vertical pivotal movement about the first axis B of the support member 6 and the vertical pivotal movement about the second axis P of the guide wheel 3.

This is evident from actual measurement results shown in Table 1 below.

Table 1 shows actual measurement results of distances D1 between the guide wheel 3 and rear gears G1–G7 when the chain C in the derailleur of the present invention is engaged with each of these seven rear gears as shown in FIG. 1, and distances D2 between the guide wheel 3 and rear gears G1–G7 when the chain C in the conventional derailleur is engaged with each of these seven rear gears as shown in FIG. 9. The measurements were taken both for the derailleur according to the present invention and for the conventional derailleur, with the chain engaging a front gear having 48 teeth and a front gear having 28 teeth.

[TABLE 1]

| Distance D1 or D2 between guide wheel 3 and gears G1–G7 | | | | |
|---|---|---|---|---|
| number of rear gear teeth | conventional | | invention | |
| | number of front gear teeth | | | |
| | 48 | 28 | 48 | 28 |
| 13 | 20 mm | 31 mm | 17 mm | 19 mm |
| 15 | 19 mm | 24 mm | 15 mm | 15 mm |
| 17 | 16.5 mm | 16.5 mm | 13.5 mm | 13.5 mm |
| 19 | 14 mm | 13.5 mm | 11.5 mm | 9.5 mm |
| 21 | 12 mm | 10.5 mm | 9 mm | 7 mm |
| 24 | 9 mm | 3.5 mm | 7 mm | 4 mm |
| 28 | 5 mm | 2 mm | 4.5 mm | 2 mm |

A further embodiment will be described next.

Figure 5:
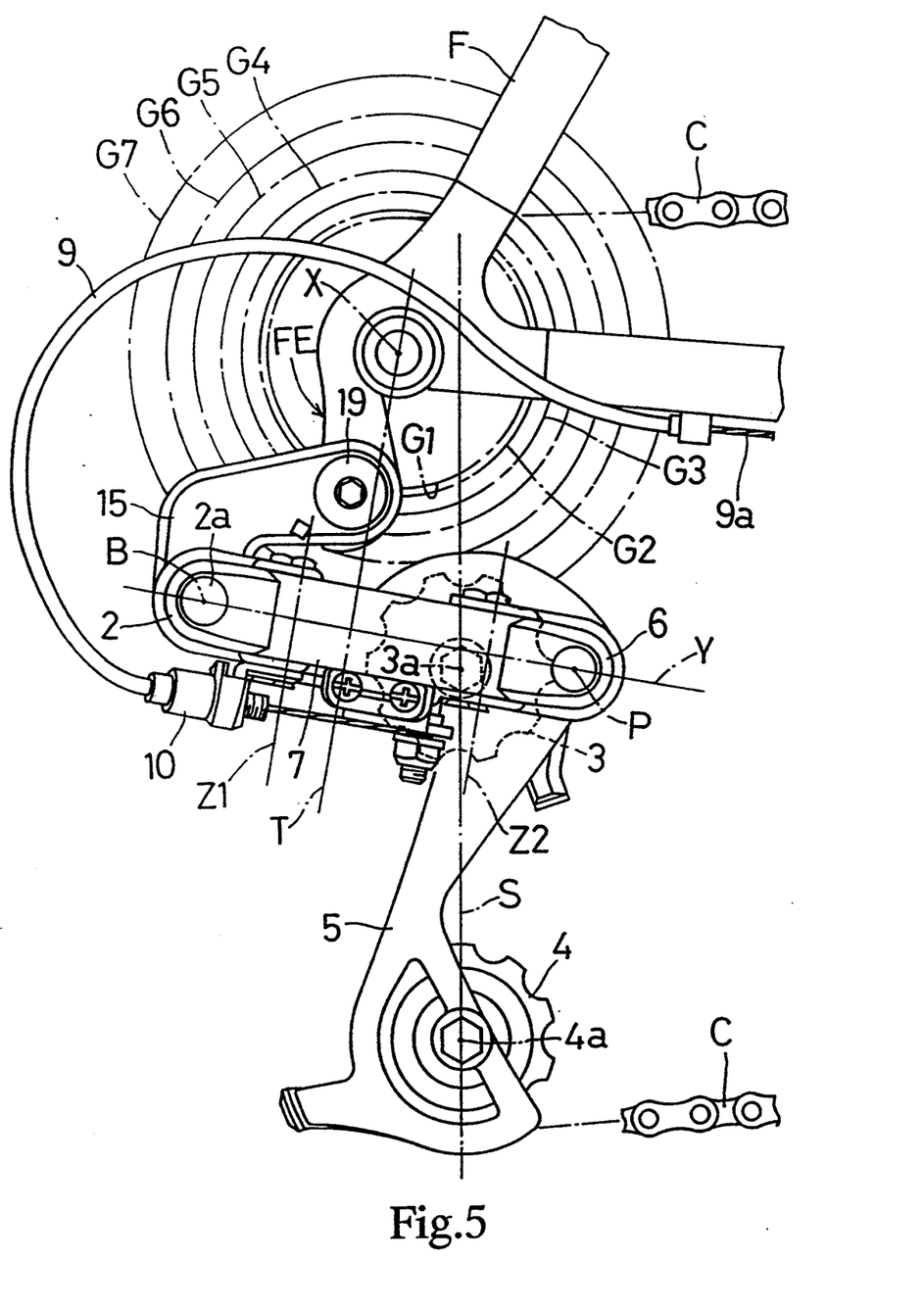
FIG. 5 is a side view of a rear derailleur in a further embodiment of the present invention.
Figures 7, 8:
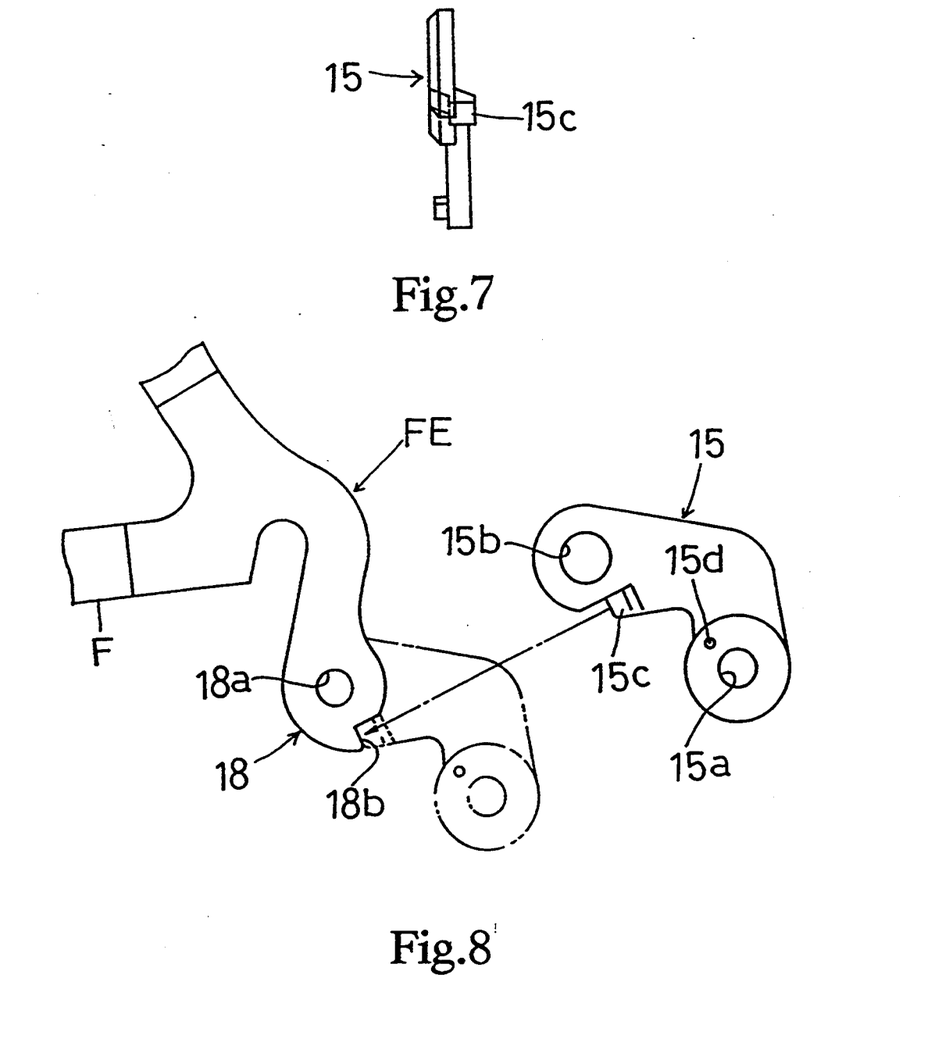
FIG. 7 is a side view of the mounting member shown in FIG. 6.
FIG. 8 is a view showing a way in which the mounting member in the further embodiment is connected to a bicycle frame.

FIG. 5 shows a rear derailleur including a main derailleur body identical to the construction shown in FIG. 1, but a mounting member different from what is shown in FIG. 1. Specifically, as shown in FIG. 8, this mounting member 15 is constructed for attachment to a bicycle frame F having a derailleur mounting extension 18 formed integrally with a rear fork end FE by casting.

Figure 6:
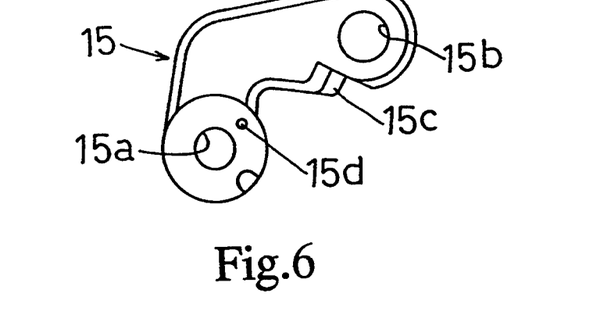
FIG. 6 is a front view of a mounting member in the embodiment shown in FIG. 5.

As shown in FIG. 6, the mounting member 15 is in the form of an approximately L-shaped plate in front view. The mounting member 15 includes a first circular bolt bore 15a disposed adjacent a rear end thereof to act as a coupling device for connection to the main derailleur body, and a second circular bolt bore 15b disposed adjacent the other, forward end to act as a coupling device for connection to the bicycle frame F. As shown in FIG. 7, the mounting member 15 further includes a projection 15c formed on a back surface thereof adjacent the second bolt bore 15b. The entire derailleur is connected, in a suitable assembly posture as shown in FIG. 5, to the bicycle frame F, with the main derailleur body connected to the mounting member 15, to be shiftable smoothly and with excellent responsivity.

Specifically, the first bolt bore 15a is used to connect the bracket member 2 of the main derailleur body to the mounting member 15. That is, the first bolt bore 15a receives a mounting bolt 2a attached to the bracket member 2, whereby the bracket member 2 is connected to the mounting member 15 to be pivotable about the first axis B.

The second bolt bore 15b is used to connect the mounting member 15 to the derailleur mounting extension 18. As shown in FIG. 5, a connecting bolt 19 is placed to extend through the second bolt bore 15b and a bolt bore 18a defined in the derailleur mounting extension 18. The connecting bolt 19 is then tightened to rigidly interconnect the mounting member 15 and derailleur mounting extension 18.

The projection 15c and second bolt bore 15b act as a position setting device to set the mounting member 15 to a predetermined posture relative to the rear fork end FE as shown in FIG. 5.

That is, as shown in FIG. 8, the mounting member 15 is tightened and fixed to the rear fork end FE with the projection 15c contacting a stopper 18b formed integrally with the derailleur mounting extension 18 by casting. In this state, the projection 15c contacting the stopper 18b prevents the mounting member 15 from pivoting about the connecting bolt 19 relative to the rear fork end FE. With the second bolt bore 15b allowing the connection between the mounting member 15 and derailleur mounting extension 18 through the connecting bolt 19, and with the mounting member 15 prevented from pivoting about a position adjacent the projection 15c relative to the rear fork end FE, the projection 15c and bolt bore 15b combine to fix the mounting member 15 to the predetermined posture relative to the rear fork end FE. The rear derailleur is assembled to the bicycle frame F in a suitable posture, as shown in FIG. 5, through the mounting member 15 attached in the predetermined posture to the derailleur mounting extension 18, and with the shapes of and positional relationship between the first bolt bore 15a and second bolt bore 15b. In this state, the rear derailleur is operable smoothly and with excellent responsivity.

The mounting member 15 is attached in the predetermined posture to the derailleur mounting extension 18 as noted above. As in the derailleur shown in FIG. 1, the chain C is wound around the guide wheel 3 and tension wheel 4, the rear gear G1 having 13 teeth, and the largest front gear. Front and rear wheels of the bicycle frame are placed on a level ground. Further, the second phantom line S extending through the rotational axis 3a of the guide wheel 3 and the rotational axis 4a of the tension wheel 4 is placed perpendicular to the ground. Then, as shown in FIG. 5, the third phantom line T extending parallel to the first pivotal axis Z1 about which the outer pivot link 7 is pivotable relative to the bracket member 2, and to the second pivotal axis Z2 about which the outer pivot link 6 is pivotable relative to the support member 6, and extending through the hub axis X, is located between the first pivotal axis Z1 and second pivotal axis Z2 as seen in the direction along the hub axis. Further, as seen in the direction along the hub axis, the rotational axis 3a of the guide wheel 3 is located below the first phantom line Y. This position corresponds to the suitable posture noted above.

The projection 15c of the mounting member 15 is formed by embossing, to the back of the mounting member 15, a portion of the plate forming the mounting member 15. As shown in FIGS. 3 and 6, the mounting member 1 or 15 defines a bore 1d or 15d adjacent the bolt bore 1a or 15a for receiving one end of the first tension spring 12 to connect the first tension spring 12 to the mounting member 1 or 15.

In the suitable assembly posture of the derailleur in each of the above embodiments, the rotational axis 3a of the guide wheel 3 is located below the first phantom line Y. However, this rotational axis 3a may be located on the first phantom line Y. That is, when the guide wheel 3 pivots downward about the second axis P relative to the gear G1, the rotational axis 3a begins to descend from the position corresponding to or adjacent the second axis P. Then, the guide wheel 1 moves downward by a long distance for a downward pivoting angle of the guide wheel 3. Thus, the guide wheel 3 is vertically movable in an efficient way relative to the gears.

The mounting member 1 may include a projection or a set pin in place of the threaded bore 1c, for contacting the fork end. The projection 15c may be replaced by a set bolt.

Besides the derailleur used with a gear assembly including a gear having 13 teeth, the present invention is applicable to a derailleur used with a gear assembly not including a gear having 13 teeth. In this case, a rear gear having 13 teeth is temporarily added for assembled position setting purposes.

What is claimed is:

1. A rear derailleur for a bicycle comprising:
   a hub axis extending transversely of said bicycle;
   a mounting member including a coupling portion for connection to a bicycle frame;
   a bracket body supported by said mounting member to be pivotable about a first axis extending substantially parallel to said hub axis;
   a support member disposed forwardly of said bracket member for supporting a chain guide wheel and a chain tension wheel to be pivotable about a second axis extending substantially parallel to said first axis;
   a pair of pivot links arranged substantially parallel to a first phantom line extending through said first axis and said second axis as seen in a direction along said hub axis, for interconnecting said bracket member and said support member;
   a first tension spring for biasing said bracket member to pivot relative to said bicycle frame, thereby to apply a tension to a chain; and
   a second tension spring for biasing said chain guide wheel and said chain tension wheel to pivot relative to said support member, thereby to apply a tension to said chain;
   wherein said mounting member has such a construction that, when said rear derailleur is connected to said bicycle frame through said mounting member, with said chain wound around a rear gear mounted on said bicycle frame and having 13 teeth, said guide wheel and said tension wheel, and with a second phantom line extending vertically, as seen in the direction along said hub axis, through a rotational axis of said guide wheel and a rotational axis of said tension wheel, a third phantom line extending parallel to a first pivotal axis about which an outer one of said pivot links is pivotable relative to said bracket member, and to a second pivotal axis about which said outer pivot link is pivotable relative to said support member, and extending through said hub axis, is located between said first pivotal axis and said second pivotal axis as seen in the direction along said hub axis, and said rotational axis of said guide wheel is located level with or below said first phantom line as seen in the direction along said hub axis.

2. A rear derailleur as defined in claim 1, wherein said coupling portion includes a cutout.

3. A rear derailleur as defined in claim 1, wherein said coupling portion includes a bolt bore.

4. A rear derailleur as defined in claim 1, wherein said mounting member includes position setting means for determining a position of said mounting member relative to said bicycle frame when said mounting member is connected to said bicycle frame, whereby said rear derailleur assumes said assembly posture.

5. A rear derailleur as defined in claim 4, wherein said position setting means includes said coupling portion and a threaded bore.

6. A rear derailleur as defined in claim 4, wherein said position setting means includes said coupling portion and a projection.

7. A rear derailleur as defined in claim 1, wherein said mounting member has such a construction that, when said mounting member is connected to said bicycle frame, with said chain wound around said rear gear mounted on said bicycle frame and having 13 teeth, said guide wheel and said tension wheel, and with said second phantom line extending vertically, as seen in the direction along said hub axis, through the rotational axis of said guide wheel and the rotational axis of said tension wheel, said second phantom line extends through a position rearwardly of a forward end of said mounting member as seen in the direction along said hub axis.

8. A rear derailleur as defined in claim 4, wherein, when said mounting member is connected to said bicycle frame through said position setting means, said mounting member as a whole extends rearwardly of said bicycle frame, with a fore and aft length of said mounting member exceeding a vertical length thereof.

9. A rear derailleur as defined in claim 4, wherein, when said mounting member is connected to said bicycle frame through said position setting means, said mounting member includes a cutout defined in a forward region thereof to act as said coupling portion, a threaded bore defined adjacent and rearwardly of said cutout to form part of said position setting means, and a bolt bore defined in a rearward region of said mounting member for attaching said bracket member to said mounting member.

10. A rear derailleur as defined in claim 9, wherein said mounting member further includes a bore defined in a rearward position thereof for engaging one end of said first tension spring.

11. A rear derailleur as defined in claim 4, wherein, when said mounting member is connected to said bicycle frame through said position setting means, said mounting member includes a bolt bore defined in a forward region thereof to act as said coupling portion, a projection disposed adjacent said bolt bore to form part of said position setting means, and a further bolt bore defined in a rearward region of said mounting member for attaching said bracket member to said mounting member.

12. A rear derailleur as defined in claim 11, wherein said mounting member further includes a bore defined in a rearward position thereof for engaging one end of said first tension spring.

13. A rear derailleur as defined in claim 1, wherein said first tension spring is disposed between said mounting member and said bracket member die biasing said bracket member toward said hub axis.

14. A rear derailleur as defined in claim 1, wherein said second tension spring biases said guide wheel toward said hub axis.

15. A mounting apparatus for attaching to a bicycle frame a rear derailleur having a hub axis extending transversely of the bicycle, a bracket body supported to be pivotable about a first axis extending substantially parallel to the hub axis, a support member disposed forwardly of the bracket member for supporting a chain guide wheel and a chain tension wheel to be pivotable about a second axis extending substantially parallel to the first axis, a pair of pivot links arranged substantially parallel to a first phantom line extending through the first axis and the second axis as seen in a direction along the hub axis for interconnecting the bracket member and the support member, a first tension spring for biasing the bracket member to pivot relative to the bicycle frame, thereby to apply a tension to a chain, and a second tension spring for biasing the chain guide wheel and the chain tension wheel to pivot relative to the support member, thereby to apply a tension to the chain, said mounting apparatus comprising:

a coupling portion for connection to said bicycle frame; and a bolt bore for connection to said bracket member;

wherein said mounting apparatus has such a construction that, when said mounting apparatus is connected to said bicycle frame, with said chain wound around a rear gear mounted on said bicycle frame and having 13 teeth, said guide wheel and said tension wheel, and with a second phantom line extending vertically, as seen in the direction along said hub axis, through a rotational axis of said guide wheel and a rotational axis of said tension wheel, a third phantom line extending parallel to a first pivotal axis about which an outer one of said pivot links is pivotable relative to said bracket member, and to a second pivotal axis about which said outer pivot link is pivotable relative to said support member, and extending through said hub axis, is located between said first pivotal axis and said second pivotal axis as seen in the direction along said hub axis, and said rotational axis of said guide wheel is located level with or below said first phantom line as seen in the direction along said hub axis.

* * * * *